United States Patent [19]

Aoki et al.

[11] 4,299,719

[45] Nov. 10, 1981

[54] DEOXIDIZER

[75] Inventors: Motohisa Aoki, Funabashi; Isao Kawakami, Machida; Masami Nishihara, Okayama, all of Japan

[73] Assignees: Mitsubishi Chemical Ind., Ltd., Tokyo; Teikoku Kako Co., Ltd., Osaka, both of Japan

[21] Appl. No.: 87,498

[22] Filed: Oct. 23, 1979

[30] Foreign Application Priority Data

Oct. 23, 1978 [JP] Japan ................... 53-130245
May 11, 1979 [JP] Japan ................... 54-57864
May 11, 1979 [JP] Japan ................... 54-57865
Jul. 16, 1979 [JP] Japan ................... 54-85541

[51] Int. Cl.$^3$ .................. C09K 15/02; A23B 7/14; A23D 5/04
[52] U.S. Cl. .................. 252/188; 252/397; 423/219; 423/231; 423/232; 426/541
[58] Field of Search .............. 252/188, 397; 426/541; 423/219, 231, 232

[56] References Cited

U.S. PATENT DOCUMENTS

| | | | |
|---|---|---|---|
| 2,825,651 | 3/1958 | Loo et al. | 252/188 |
| 3,016,336 | 1/1962 | Scott et al. | 426/541 |
| 3,169,068 | 2/1965 | Bloch | 426/541 |

OTHER PUBLICATIONS

Bailar et al., Comprehensive Inorganic Chemistry, Pergamon Press, 1973, p. 1010.

*Primary Examiner*—Benjamin R. Padgett
*Assistant Examiner*—Irwin Gluck
*Attorney, Agent, or Firm*—Oblon, Fisher, Spivak, McClelland & Maier

[57] ABSTRACT

A deoxidizer comprises ferrous carbonate having a specific surface area of at least 20 $m^2/g$. The ferrous carbonate can be combined with a mixture of a reduced iron powder and a metal halide; or an alkli metal hydroxide and/or an alkline earth metal hydroxide or calcium oxide and/or ettringite. The deoxidizer is used for the deoxidation of a package so as to substitute oxygen by carbon dioxide.

10 Claims, 17 Drawing Figures

DEOXIDIZER

BACKGROUND OF THE INVENTION

1. Field of the Invention

The present invention relates to a deoxidizer. More particularly, it relates to a deoxidizer which causes less variation of a pressure in a container when it is used in a sealed container.

2. Description of the Prior Arts

When foods containing oils such as potato chips and peanut are exposed to air, oxidized products and peroxides are formed to deteriorate taste and sometimes to be toxic. On the other hand, when fruits are exposed to air after their harvest, they are overripen for a short period by their respiration so as to decrease valves as commodity. When vegetables and fishes are stored in air, they got moldy or are rotten. When furs and clothes are stored in air, they are eaten by worm or moldy.

In order to protect the stored goods, from these damages, it has been proposed to employ a freezing method, a refrigerating method, a vacuum package method, an inert gas purge method, an insect repellent method and a fungicidal method. On the other hand, a food additive such as an antioxidant is used.

Thus, the freezing method requires a large equipment and a complicated operation to be expensive. The insect repellents and the fungicides are usually toxic to human body. The food additives may cause various affects to human body, and the use of the good additives is being regulated.

In order to prevent the oxidation of oils, and to prevent survival or proliferations of fungi, bacteria, and insects and to inhibit the over-ripen of fruits, it is desired to eliminate oxygen from the atmosphere in containers and bags and to feed carbon dioxide gas at a ratio of smaller than the eliminated oxygen gas so as to maintain the containers and the bags under slightly higher pressure. Thus, the effect of carbon dioxide for inhibition of proliferation of fungi or for inhibition of over-ripening of fruits may be expected.

SUMMARY OF THE INVENTION

It is an object of the present invention to provide a deoxidizer which is used in a gas impermeable container or package.

It is another object of the present invention to provide a deoxidizer which deoxidizes and generates carbon dioxide so as to substantially balance a gas volume.

The foregoing and other objects of the present invention have been attained by providing a deoxidizer having ferrous carbonate as a main component.

The ferrous carbonate having a specific surface area of at least 20 m$^2$/g is preferably used. It is further preferable to combine ferrous carbonate with a mixture of reduced iron powder and a metal chloride or an alkali metal hydroxide and/or an alkaline earth metal hydroxide or calcium oxide and/or ettringite.

DETAILED DESCRIPTION OF THE PREFERRED EMBODIMENTS

Figure 1:
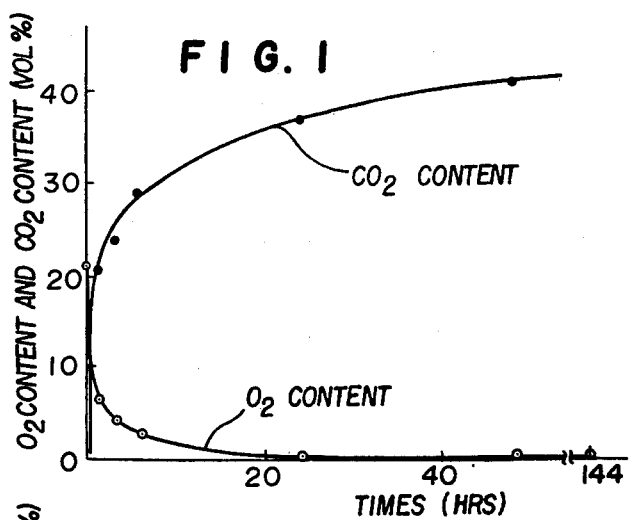
FIGS. 1 and 2 are respectively graphs of variations of the oxygen content and the carbon dioxide content (Examples 1 and 2) in times.

Ferrous carbonate is produced as siderite having hexagonal system. Ferrous carbonate can be obtained by adding an alkali carbonate to an aqueous solution of a ferrous salt in an atmosphere from which air is eliminated, and heating the resulting precipitate at 150° C. The ferrous carbonate is gradually decomposed in a moistened air to form ferric hydroxide.

However, such ferrous carbonate obtained by the conventional process decomposes at a slow speed and is not suitable as a deoxidizer for usual applications because of slow speed of deoxidation.

The inventors have studied to obtain a deoxidizer which can be practically useful and have found that a specific surface area of ferrous carbonate has close relationship to the function of deoxidation. The foundamental consideration of the present invention is based on the finding.

The deoxidizer of the present invention comprises ferrous carbonate having a specific surface area of at least 20 m$^2$/g.

The ferrous carbonate as a main component of the deoxidizer of the present invention can be obtained by dissolving a ferrous salt such as ferrous sulfate in water and adding an alkali carbonate such as sodium carbonate without air in the atmosphere to precipitate ferrous carbonate and coagulating the precipitate by adding a coagulant and filtering and drying the coagulated precipitate without air in the atmosphere.

When the ferrous carbonate is used as a deoxidizer, it is necessary to incorporate water at a desired ratio such as more than 5 wt.% based on the ferrous carbonate. When the ratio of water is more than 15 wt.% based on the ferrous carbonate, the increase of the speed of the deoxidation is reduced but the speed for generating carbon dioxide is increased.

It is preferable to use the ferrous carbonate having a specific surface area of greater than 20 m$^2$/g especially greater than 50 m$^2$/g and having crystal lattice of less than 400 Å.

When the ferrous carbonate is used as a deoxidizer, it is preferable to combine the other components such as a drier e.g. silica gel and the other deoxidizer such as iron powder.

The deoxidizer of ferrous carbonate absorbes oxygen and water to generate carbon dioxide gas. Thus, when the deoxidizer is kept in a sealed system, the pressure in the system is increased in the progress of the deoxidation.

The inventors have further studied to obtain a deoxidizer of ferrous carbonate which does not cause an increase of the pressure in the system.

Thus, it has been found that the deoxidizer which attaines said purpose can be obtained by combining ferrous carbonate with reduced iron powder.

It is preferable to combine ferrous carbonate with reduced iron powder and a metal halide. The reduced iron can be reduced iron powder, electrolyzed iron powder, sprayed iron powder or pulverized iron powder. The particle size is preferably 10 mesh pass especially 50 mesh pass.

A ratio of the reduced iron powder is preferably at a ratio of 0.01 to 5 wt. part per 1 wt. part of ferrous carbonate and is selected from said range depending upon the condition.

The pressure in the system is decreased in the progress of the deoxidation by the reduced iron powder. This property is contrary to the property of ferrous carbonate. Thus, both properties are combined to control the pressure as desired by selecting the ratio of the reduced iron powder to the ferrous carbonate.

When the ratio of the reduced iron powder to the ferrous carbonate is too small, the volume of carbon dioxide generated is larger than the volume of oxygen absorbed by the ferrous carbonate and the reduced iron powder whereby the pressure in the system is higher than the atmospheric pressure. When the ratio of the reduced iron powder to the ferrous carbonate is too large, the volume of oxygen absorbed is larger then the volume of carbon dioxide generated whereby the pressure in the system is lower than the atmospheric pressure. In order to maintain the pressure in the system, the ratio is selected as desired.

In said range, the pressure in a container at 1 atm. is varied in a range of only 0.85 to 1.15 atm. whereby a deformation of the container may not be caused.

The metal halide is needed for the deoxidation by the reduced iron powder. Suitable metal halides include sodium chloride, potassium chloride, sodium bromide and potassium bromide. Thus, sodium chloride is optimum.

The metal halide is usually incorporated at a ratio of 0.0001 to 1 wt. part preferably 0.001 to 0.5 wt. part per 1 wt. part of the reduced iron powder. When the ratio of the metal halide to the reduced iron powder is too low, the speed of the deoxidation is too slow. When the ratio is too high, the deliquescence of the metal halide is caused to damage the product.

The composition imparts the deoxidation effect in the presence of water. The water content is usually in a range of 10 to 35 wt.% based on the total weight of the ferrous carbonate and the reduced iron powder. When water is in the system, for example, to use the composition for the storage of fresh foods, it is unnecessary to incorporate water in the composition. Water can be incorporated by various forms if water content is not enough.

The water content is adjusted as desired. For example, the water content is preferably small when the composition is used for the storage of dried foods.

In order to control the pressure in the system, it is also preferable to continue an alkali metal hydroxide and/or an alkaline earth metal hydroxide.

Suitable alkali metal hydroxides include sodium hydroxide and potassium hydroxide. Suitable alkaline earth metal hydroxides include calcium hydroxide and magnesium hydroxide.

A ratio of the ferrous carbonate to the hydroxide is usually in a range of 1:0.02 to 10 preferably 1:0.04 to 2 especially 1:0.05 to 1.

The ratio is selected as desired depending upon the condition.

When the ratio is of the hydroxide to the ferrous carbonate is too small, the pressure in the system is higher because of the large volume of carbon dioxide whereas when the ratio is too large, the pressure in the system is to be a reduced pressure.

When the pressure in a container is controlled in a range of 0.85 to 1.15 atm. by selecting the ratio, the container is not deformed or broken by the deoxidation.

It is enough to use 2 to 15 g preferably 3 to 6 g of ferrous carbonate per 100 ml of oxygen (about 500 ml of air). The amount of the deoxidizer is depending upon the volume of the container and also the gas permeability of the container. In order to maintain the non-oxygen condition for a container having inferior gas barrier property, it is necessary to use a large amount of the deoxidizer so as to maintain the deoxidation for a long period and to impart slowly the deoxidation.

The water content is preferably in a range of 7 to 35 wt.% based on the ferrous carbonate.

The hydroxide especially an alkali metal hydroxide is preferably coated with a wax or a silicon oil before the mixing.

In the other embodiment, it is preferable to combine the ferrous carbonate with calcium oxide and/or ettringite if necessary further an alkali metal hydroxide and/or an alkaline earth metal oxide.

Ettringite is a crystalline material having the formula 3CaO.Al$_2$O$_3$. 3CaSO$_4$.nH$_2$O
(n=30.5, 32)
and can be a natural product or an artificial product.

The artificial ettringite can be obtained by calcining a mixture of calcium carbonate, bauxite, and gypsum at high temperature and hydrolyzing it or by reacting aluminum sulfate with a water soluble calcium salt in the presence of water.

Certain Examples of the composition as the deoxidizer are shown.

|  | weight | | | parts | |
| --- | --- | --- | --- | --- | --- |
| ferrous carbonate | 100 | 100 | 100 | 100 | 100 |
| calcium oxide | 6–25 | — | 4–20 | 3–18 | 3–18 |
| ettringite | — | 12–50 | 10–40 | 8–35 | 8–35 |
| alkali metal hydroxide | — | — | — | 4–16 | — |
| alkaline earth metal hydroxide | — | — | — | — | 4–16 |

It is enough to use 2 to 15 g preferably 3 to 6 of ferrous carbonate per 100 ml of oxygen (about 500 ml of air). The amount of the deoxidizer is depending upon the volume of the container and also the gas permeability of the container.

The above-mentioned discussions are applied in this case.

The packing form of the deoxidizer of the present invention is to pack the deoxidizer in a gas permeable bag made of paper, a laminated paper, a plastic film etc. The bag is charged in a container such as a bag made of gas impermeable material and the outer bag is sealed for the storage.

When the bag is used, the outer bag is opened and is charged in a container for the deoxidation and the container is sealed.

The deoxidizer of the present invention is effective for the storage of confectionery especially oiled confectionery and cakes; the inhibition of over-ripenning of fruits, the insect repellent of furs and the inhibition of fungi in optical instruments. When the deoxidizer is used, the increase or decrease of the pressure in the container to deform or to break it, can be prevented in safe.

The present invention will be further illustrated by certain examples which are provided for purposes of illustration only and are not intended to be limiting the present invention.

EXAMPLE 1

Ferrous carbonate was produced by dissolving 1 kg of ferrous sulfate heptahydrate in 6 liters of distilled water and adding 0.4 kg of sodium carbonate with stirring in nitrogen atmosphere. After the addition of sodium carbonate, pH was 7.5. Then, a coagulant Diaclear MA-300H was added to the reaction mixture at 5 ppm so as to coagulate the precipitate of ferrous carbonate.

Sodium sulfate was removed from the precipitate by three times of decantation with distilled water. After the decantation, the filtration of a slurry was carried out in a dry box purged with nitrogen gas. The cake of ferrous carbonate was dried in a vacuum drier purged with nitrogen under a reduced pressure at 80° C. for about 5 hours The dried product was sampled and weighed in a dry box and was used for analyses of a water content and ferrous ions and a test for deoxidation. The water content was measured by heating the sample in a vaporizer at 250° C. and introducing the vaporized gas into Karl Fisher's reagent. The water content was 13.8 wt.%. Ferrous ion content was 41 wt.% based on the sample. Ferrous carbonate content was measured by an amount of carbon dioxide generated by charging the sample into an aqueous solution of sulfuric acid. The ferrous carbonate content in the sample was about 85 wt.%. According to X ray diffraction of the crystal, most of the product was in a form of fine particles in a crystalline range. A specific surface area measured by BET method was 70 m$^2$/g.

In a dry box, 5.0 g of the sample was weighed and charged into a small polyethylene film bag having gas barrier property and the bag was heat-sealed. The small bag containing 5 g of ferrous carbonate was put into a large bag having high gas barrier property equipped with a rubber stopper sample inlet and the large bag was heat-sealed and then, 500 ml of air was introduced into the bag by a gas sampler. The bag was kept in a room at 20° C. and then the small bag was broken to contact air with ferrous carbonate.

The decrease of oxygen and the increase of carbon dioxide during the contact time were measured and plotted in FIG. 1 wherein the curve —○—○— shows variation of residual oxygen content and the curve —●—●— shows variation of generated carbon dioxide.

EXAMPLE 2

Pulverized ferrous carbonate was used as seeds at a ratio of 1 wt.% based on the precipitated ferrous carbonate. The process of Example 1 was repeated except adding the pulverized ferrous carbonate as the seeds and aging the mixture at 70° C. for 1.5 hours to obtain the precipitate of ferrous carbonate.

The analyses of Example 1 were carried out after the filtration and the drying. The water content was 13.6 wt.%. The ferrous ion content was 86 wt.% based on the total iron component. The specific surface area measured by the BET method was 21 m$^2$/g.

Figure 2:
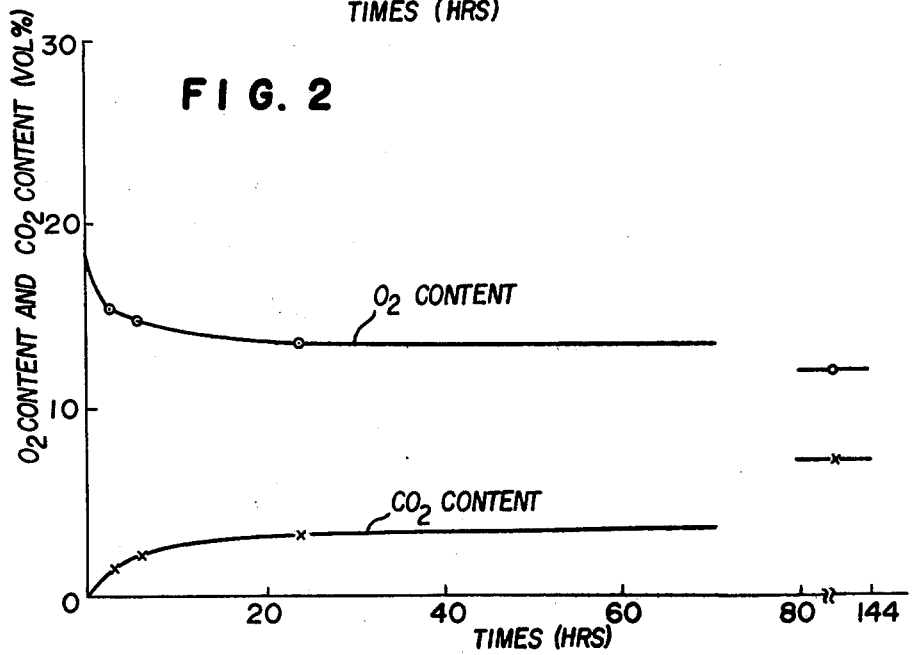

In accordance with the tests of Example 1, the rate of the deoxidation and the rate of the generation of carbon dioxide were measured. The results are shown in FIG. 2.

EXAMPLE 3

Siderite produced in West German was pulverized to be particle sizes of about 0.1 to 1μ. The specific surface area of the pulverized siderite was 7.3 m$^2$/g. Hydrated vermiculite was added to the pulverized siderite. The water content was 19 wt.% based on siderite.

In accordance with the test of Example 1, the rate of the deoxidation was measured. The result is shown as the curve a in FIG. 3.

Figure 3:
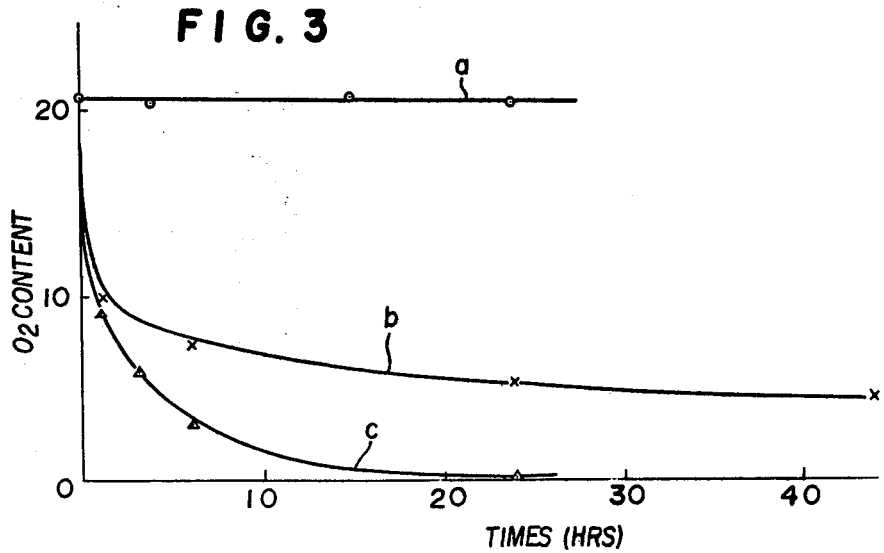
FIG. 3 is a graph of variation of oxygen contents (Example 3) in times.

In FIG. 3, the rate of the deoxidation of the sample of Example 1 dried to have a water content of 6.7 wt.% as the sample b and that of the mixture of the sample b and hydrated vermiculite to have a water content of 14 wt.% as the sample c.

As it is clearly found in FIG. 3, the rate of the deoxidation was substantially the same in the cases that the hydrated vermiculite was admixed or the hydrated ferrous carbonate was used. It is understood that the desired rate of the deoxidation can be given by using ferrous carbonate which has the specific surface area of greater than 20 m$^2$/g and has a water content required for the oxygen absorption.

On the other hand, the rate of the deoxidation and the rate of the generation of carbon dioxide are too low to use it as a deoxidant when ferrous carbonate having smaller specific surface area or smaller water content.

The size of crystal lattice of each sample obtained in Examples 1 to 3 was calculated by the Scherer's equation from amplitude of diffraction grating at $2\theta°$ (Fe)=40.5° in the X ray diffraction spectrum. The results are as follows.

| Sample | size of crystal lattice |
|---|---|
| Example 1 | 150 Å |
| Example 2 | 800 Å |
| Example 3 | 1700 Å |

EXAMPLES 4 to 8

Ferrous carbonate having a purity of 85%, a specific surface area of 70 m$^2$/g, reduced iron having particle size of 100 mesh pass (manufactured by Junsei Kagaku K.K.) and sodium chloride were mixed a ratios shown in Table 1. The deoxidation effects of the samples were tested.

In the test, each sample was weighed in a dry box and charged into a small polyethylene bag having gas barrier property and the bag was heat-sealed. The small bag was opened and charged into a cylinder having high gas barrier property equipped with a rubber stopper (diameter: 8 cm; height: 10 cm). The cylinder contained 500 ml of air. Each oxygen content, each carbon dioxide content and each pressure in the cylinder were measured after 24 hours and 1 week under maintaining the cylinder at 20° C.

The results are shown in Table 1. The oxygen content in the cylinder was less than 0.1 vol.% in all cases.

TABLE 1

| Example | 4 | 5 | 6 | 7 | 8 |
|---|---|---|---|---|---|
| ferrous carbonate | 5.6 g | 3.0 g | 3.0 g | 3.0 g | 3.0 g |
| reduced iron | 0.05 g | 0.5 g | 0.5 g | 1.0 g | 0.25 g |
| sodium chloride | 3 mg | 15 mg | 30 mg | 30 mg | 15 mg |
| water | 0.025 g | 0.25 g | 0.25 g | 0.25 g | 0.25 g |
| $CO_2$ content (vol. %) | | | | | |
| after 24 hr. | 38.9 | 25.9 | 23.8 | 9.1 | 32.8 |
| after 1 week | 38.9 | 26.6 | 23.7 | 7.0 | 36.0 |
| Pressure in cylinder (atm.) | | | | | |
| after 24 hr. | 1.31 | 1.08 | 1.05 | 0.88 | 1.19 |
| after 1 week | 1.31 | 1.09 | 1.04 | 0.86 | 1.25 |

The reduced iron powder, sodium chloride and water were mixed in a dry box purged with nitrogen and the mixture was stored before the use.

EXAMPLE 9

Figure 4:
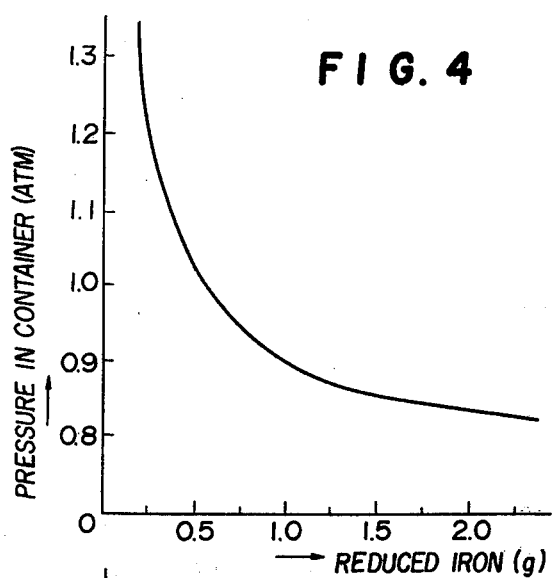
FIG. 4 is a graph of variation of the pressure in the system in variation of ratio of ferrous carbonate to the mixture of reduced iron powder and sodium chloride (Example 10)

In accordance with the process of Examples 1 to 5 except varying the ratio of the mixture of the reduced iron powder and sodium chloride to ferrous carbonate, variation of the pressure (atm.) in the cylinder was measured. The results are shown in FIG. 4.

| Volume of cylinder: | 500 ml |
|---|---|
| Ferrous carbonate: | 3.0 g |
| Reduced iron powder/ sodium chloride: | 1/0.03 by weight |

EXAMPLES 10 to 15

Calcium hydroxide powder (reagent grade) and ferrous carbonate obtained in Example 1 were respectively packed in each small bag having gas barrier property. They were charged into a cylinder made of a film having a thickness of 250μ (diameter: 8 cm; length 10 cm). The cylinder contained 500 ml of air. The cylinder was maintained at 20° C. for 2 hours and then the small bags were broken and the cylinder was sealed.

Each oxygen content and each carbon dioxide content and each pressure in the cylinder were measured in times. The results are shown in Table 4.

The oxygen content in the cylinder was less than 0.1 vol.% in all cases after 24 hours or 1 week.

Figure 5:
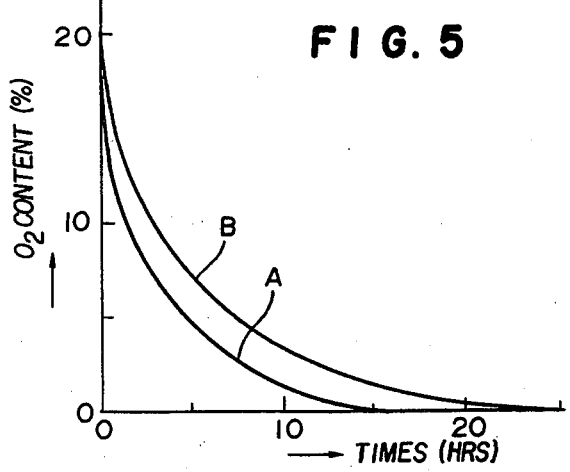
FIG. 5 is a graph of variation of oxygen contents (Example 11) in times.

Variation of oxygen content (vol.%) in Example 11 (Sample A) and the modification of Example 11 eliminating calcium hydroxide (Sample B) were measured in times. The results are shown in FIG. 5.

Figure 6:
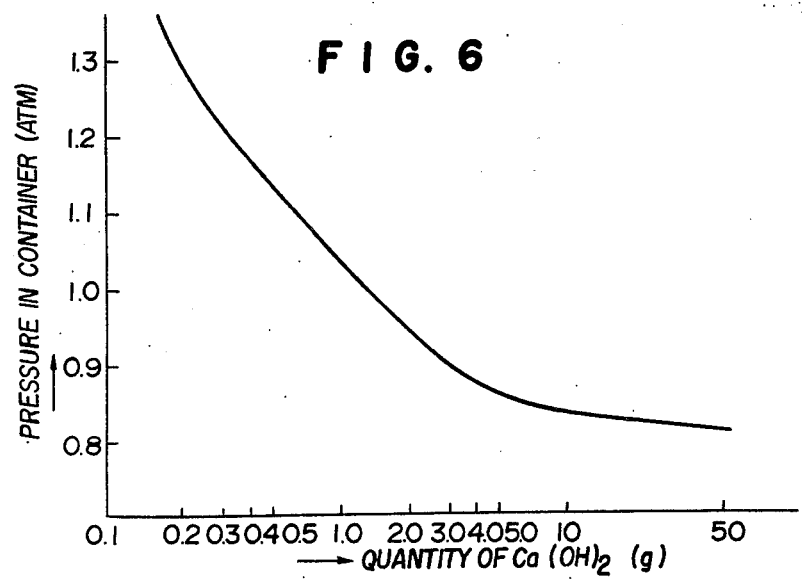
FIG. 6 is a graph of variation of the pressure in the system in variation of amount of calcium hydroxide (Example 11)

In accordance with said process except varying the amount of calcium hydroxide to 5.0 g of ferrous carbonate, variation of the pressure in the cylinder was measured. The results are shown in FIG. 6.

The oxygen content and the carbon dioxide content were measured by a gas chromatography.

TABLE 4

| Example | 11 | 12 | 13 | 14 | 15 | 16 |
|---|---|---|---|---|---|---|
| ferrous carbonate (g) | 5.0 | 5.8 | 5.5 | 4.9 | 5.6 | 4.8 |
| calcium hydroxide (g) | 1.0 | 1.5 | 1.5 | 0.5 | 0.2 | 50 |
| Content of carbon dioxide (vol. %) | | | | | | |
| after 1 day | 23.8 | 26.6 | 18.4 | 27.9 | 38.9 | 1.2 |
| after 7 day | 23.1 | 1.2 | 15.8 | 27.3 | 38.9 | 1.2 |
| Pressure in cylinder (atm.) | | | | | | |
| after 1 day | 1.05 | 1.09 | 0.98 | 1.11 | 1.31 | 0.81 |
| after 7 day | 1.04 | 0.81 | 0.95 | 1.10 | 1.31 | 0.81 |
| Note | | | | | *1 | *2 |

Note:
*1: The ratio of calcium hydroxide to ferrous carbonate is too small.
*2: The ratio of calcium hydroxide to ferrous carbonate is too large.

EXAMPLE 16

In a dry box purged with nitrogen, 50 g of ferrous carbonate having a specific surface area of 60 m²/g, and a water content of 13.5 wt.% (to $FeCO_3$) and 5.4 g of sodium hydroxide treated with wax (reagent first grade: manufactured by Junsei Kagaku K.K.) were weighed, and mixed on a mortar and 5.54 g of the uniform mixture was weighed. The mixture was packed in a polyethylene laminated paper bag having an air permeability of 10,000 seconds measured by Gurley permeability tester. The polyethylene bag was heat-sealed.

The treatment of sodium hydroxide with wax was carried out as follows.

A low molecular weight material obtained as a by-product in a medium pressure polymerization of ethylene was dissolved in n-hexane at a ratio of 5 wt.% and sodium hydroxide was dipped in the solution and dried so as to coat it with 10 wt.% of the low molecular weight material.

The oxygen content and the variation of the volume in the sealed bag were measured. The results are shown in Table 5.

TABLE 5

| Time (hour) | 0 | 1 | 3 | 6 | 24 |
|---|---|---|---|---|---|
| Oxygen content (vol. %) | 21 | 9.5 | 5.6 | 2.4 | 0.11 |
| Volume of gas (molar ratio) | 1 | 0.92 | 0.95 | 0.99 | 1.13 |

EXAMPLE 17

In accordance with the process of Example 16 except using ferrous carbonate having a specific surface area of 50 m²/g and a water content of 14 wt.% as ferrous carbonate and soda lime treated with silicone oil instead of the modified sodium hydroxide, the oxygen content and the variation of the volume were measured. The results are shown in Table 6.

The treatment of soda lime with silicone oil was carried out as follows.

Soda lime was dipped in a solution of 10 wt.% of silicone oil (KF-54 manufactured by Shinetsu Kagaku K.K.) in hexane and dried so as to coat it with 20 wt.% of silicone oil.

TABLE 6

| Time (hour) | 0 | 1 | 3 | 6 | 24 |
|---|---|---|---|---|---|
| Oxygen content (vol. %) | 21 | 8.7 | 3.4 | 1.0 | 0.09 |

TABLE 6-continued

| Time (hour) | 0 | 1 | 3 | 6 | 24 |
|---|---|---|---|---|---|
| Volume of total gas (molar ratio) | 1.0 | 0.90 | 0.87 | 0.88 | 1.01 |

EXAMPLE 18

In accordance with the process of Example 16 except using ferrous carbonate having a specific surface area of 60 m²/g and a water content of 13.6 wt.% as ferrous carbonate and magnesium hydroxide (reagent first grade manufactured by Wako Junyaku K.K.) instead of sodium hydroxide, at the following ratio, each oxygen content and each variation of the volume were measured.

The results are shown in Tables 7 and 8.

| Sample A: | Ferrous carbonate | 6 g |
|---|---|---|
| | Magnesium hydroxide | 0.79 g |
| Sample B: | Ferrous carbonate | 6 g |
| | Magnesium hydroxide | 1.18 g |

TABLE 7

Oxygen content:
(vol. %)

| Time (hour) | 0 | 1 | 3 | 6 | 24 |
|---|---|---|---|---|---|
| Sample A | 21 | 16.7 | 11.8 | 7.3 | 0.59 |
| Sample B | 21 | 15.6 | 10.5 | 6.1 | 0.34 |

TABLE 8

Variation of volume of total gas (molar ratio)

| Time (hours) | 0 | 1 | 3 | 6 | 24 |
|---|---|---|---|---|---|
| Sample A | 1.0 | 0.96 | 0.93 | 0.96 | 1.09 |
| Sample B | 1.0 | 0.96 | 0.92 | 0.95 | 1.06 |

EXAMPLE 19

TABLE 9

Figure 7:
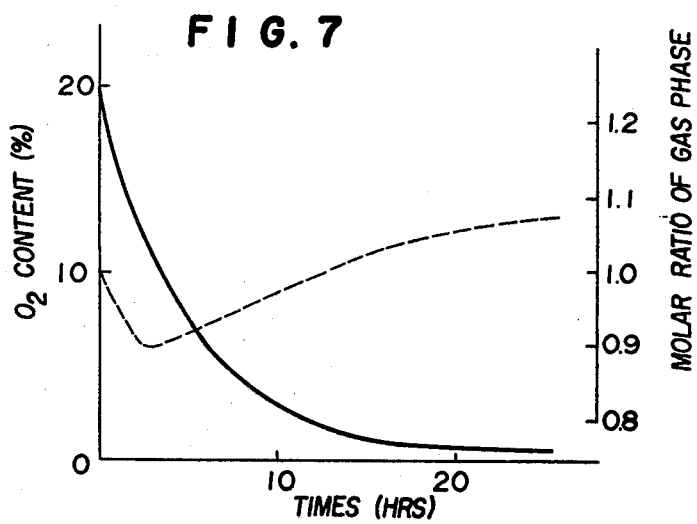
FIG. 7 is a graph of variation of the oxygen content and variation of molar ratio of gas for Sample A (Example 19) in times.
Figure 8:
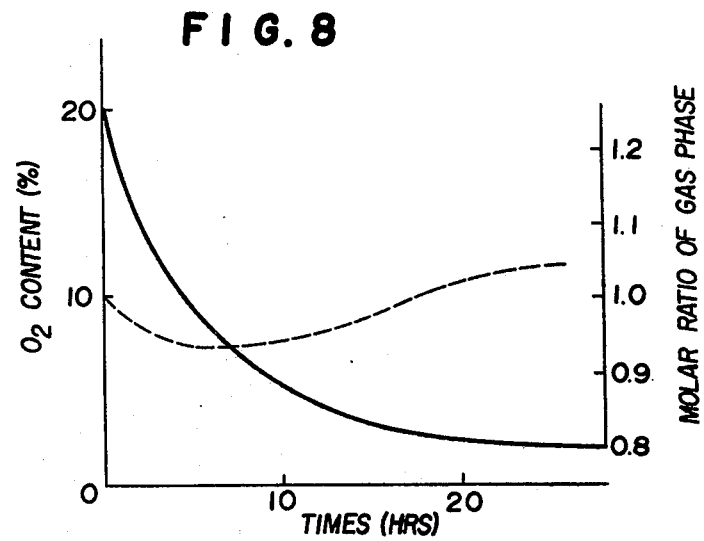
FIG. 8 is a graph of variation of the oxygen content and variation of the molar ratio of gas for Sample B (Example 19) in times.

| | Preparation of Sample | |
|---|---|---|
| Sample | A | B |
| ferrous carbonate (hydrate) | 6.17 g | 6.10 g |
| water content | 14.3% | 14.3% |
| calcium oxide | 0.76 g | 0 |
| ettringite | 0 | 1.50 g |
| Result | FIG. 7 | FIG. 8 |

In a dry box purged with nitrogen, the components shown in Table 9 were weighed and mixed to prepare Samples A and B. Each of Samples A and B was packed in a bag made of polyethylene laminated paper film (Gurley permeability of 30,000 seconds) and the bag was heat-sealed. The bag was further packed in a polyethylene bag. A large bag made of nylon-polyvinylidene chloride-polyethylene laminated film having gas barrier property equipped with a sample inlet, was used and the bag containing Sample A and B was charged in it. A makeup air containing 20% of O₂ and 80% of N₂ was packed in a film having gas barrier property. The bags containing Sample A or B and a gas sample and the makeup air bag were maintained in an air-conditioned room at 20° C. for 1 hour. The makeup air (500 ml) was charged through the gas sampler and the sample inlet into each bag containing Sample A or B and the polyethylene bag was broken to contact Sample A or B with the makeup air.

Variations of each oxygen content and each carbon dioxide content were measured by a gas chromatography. The oxygen content and the molar ratio of total gas (the molar ratio of 1.0 at the initiation) in times were shown in FIGS. 7 and 8. (the oxygen content is shown by the full line and the molar ratio of gas is shown by the dotted line)

EXAMPLE 20

TABLE 10

Figure 9:
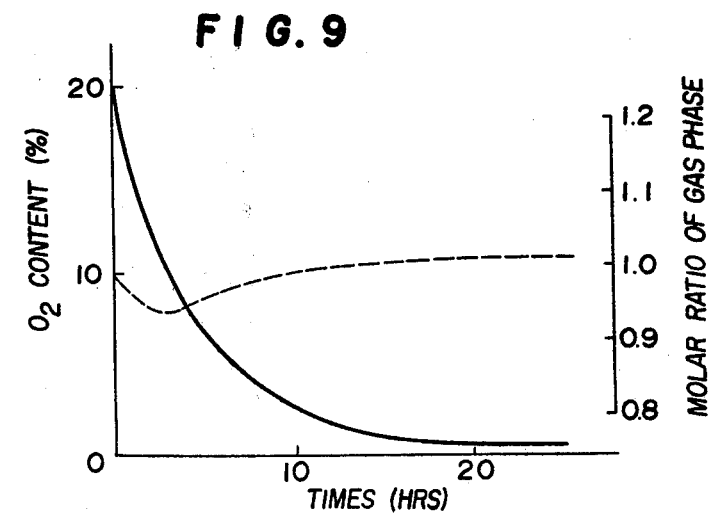
FIGS. 9 to 13 are respectively graphs of variation of the oxygen content and variation of the molar ratio of gas for Samples A, B, C, D and E (Example 20) in times.
Figure 10:
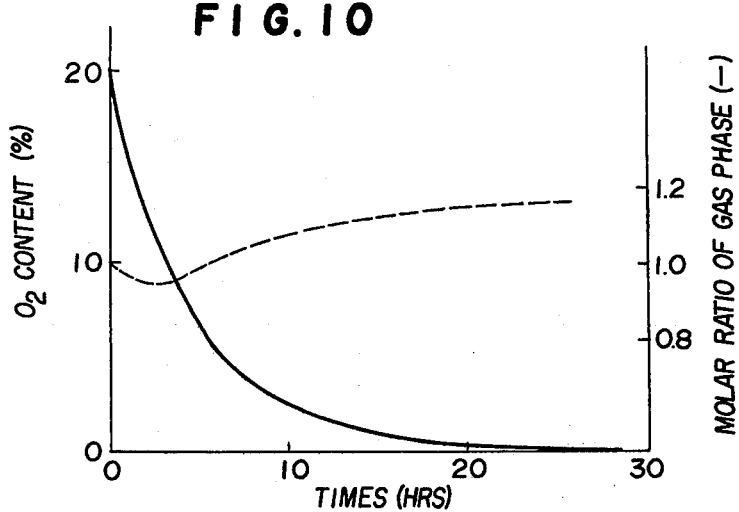
Figure 11:
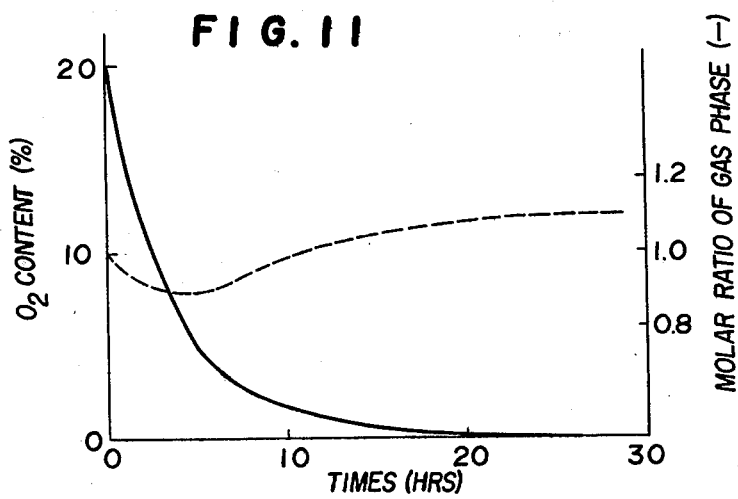
Figure 12:
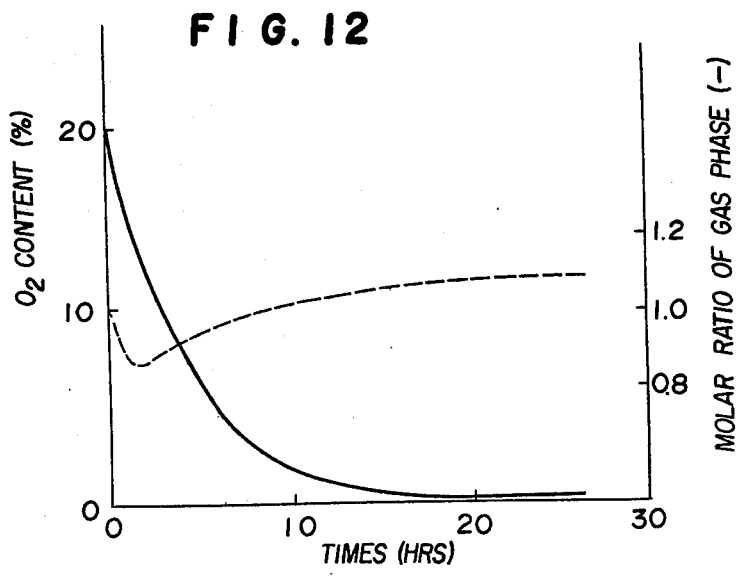
Figure 13:
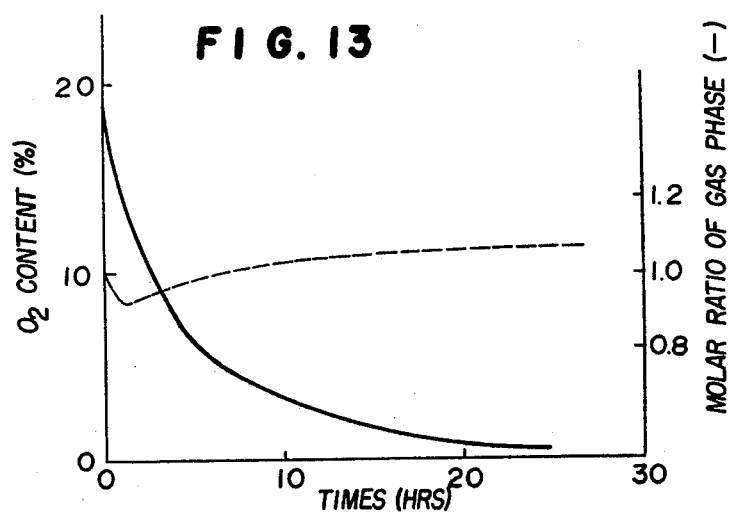

| | Preparation of Sample | | | | |
|---|---|---|---|---|---|
| Sample | A | B | C | D | E |
| ferrous carbonate (hydrate) | 7.0 | 7.0 | 6.0 | 6.0 | 6.0 |
| water content | 13.4 | 13.4 | 13.6 | 13.6 | 13.6 |
| calcium oxide | 0.88 | 0.44 | 0 | 0.60 | 0 |
| ettringite | 1.17 | 0 | 1.00 | 0 | 1.00 |
| NaOH | 0 | 0 | 0 | 0.3 | 0.3 |
| Ca(OH)₂ | 0 | 0.58 | 0.60 | 0 | 0 |
| Result | FIG. 9 | FIG. 10 | FIG. 11 | FIG. 12 | FIG. 13 |

The operation was the same with that of Example 19. The results are shown in FIGS. 9 to 13 (the oxygen content is shown by the full line and the molar ratio of gas is shown by dotted line).

In the case of Sample B, the polyethylene laminated paper film bag containing Sample B was kept in air for 30 minutes before the test.

EXAMPLE 21

TABLE 11

Figure 14:
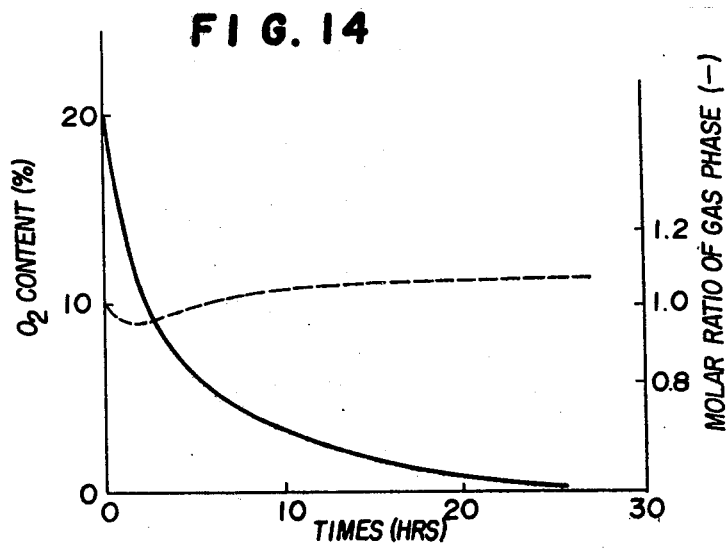
FIGS. 14 to 16 are respectively graphs of variation of the oxygen content and variation of the molar ratio of gas for Samples A, B and C (Example 21) in times.
Figure 15:
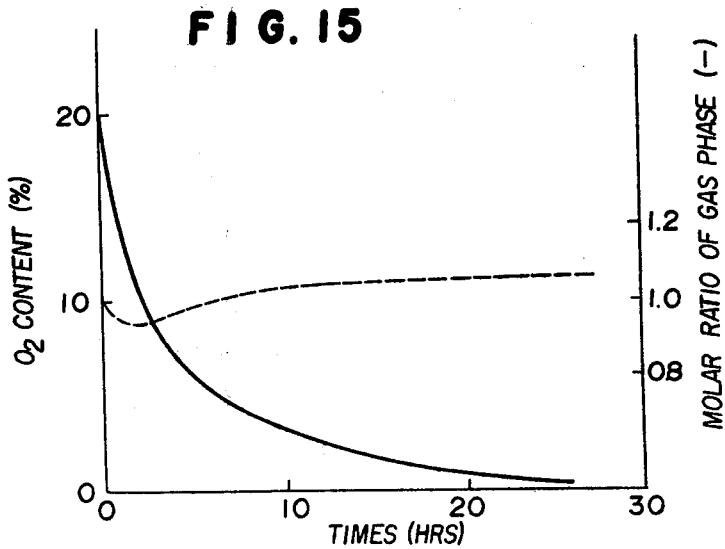
Figure 16:
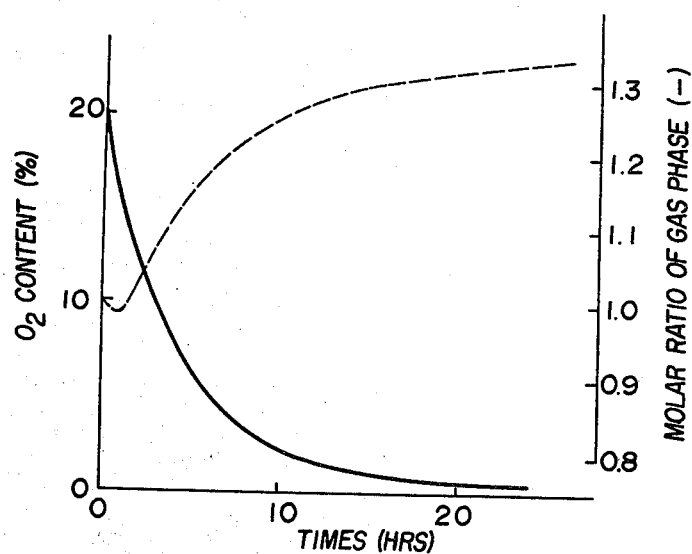

| | Preparation of Sample | | |
|---|---|---|---|
| Sample | A | B | C |
| ferrous carbonate (hydrate) | 6.0 | 6.0 | 6.03 |
| water content | 14.1 | 14.1 | 14.1 |
| calcium oxide | 0.44 | 0.44 | — |
| ettringite | 1.00 | 1.00 | — |
| NaOH | 0.2 | 0 | — |
| Ca(OH)₂ | 0 | 0.4 | — |
| Result | FIG. 14 | FIG. 15 | FIG. 16 |

The operation was the same with that of Example 20. The results are shown in FIGS. 14 and 15 (the oxygen content is shown by the full line and the molar ratio of gas is shown by the dotted line).

The result of the Sample C containing only ferrous carbonate is shown in FIG. 16.

EXAMPLE 22

Figure 17:
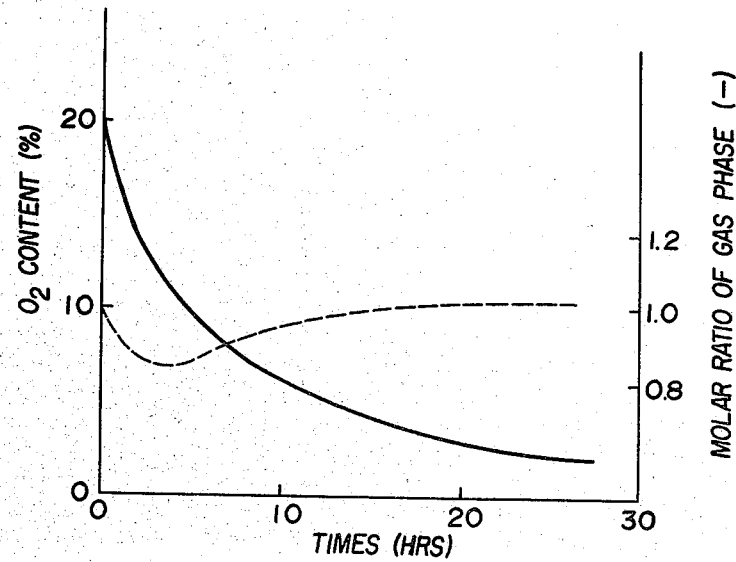
FIG. 17 is a graph of variation of the oxygen content and variation of the molar ratio of gas (Example 22) in times.

In accordance with the process of Example 19 except using a sample containing 6.03 g of ferrous carbonate (hydrate) having a water content of 14.1 wt.% and 2.0 g of calcium oxide, the tests were carried out. The result is shown in FIG. 17.

When calcium oxide content is too much, the desired effect of the addition of calcium oxide can not be expected.

We claim:

1. A deoxidizer packed in a gas permeable bag, which comprises:
   (a) a ferrous carbonate having a specific surface area of at least 20 m²/g as the main component, and
   (b) a component selected from the group consisting of (1) reduced iron powder and a metal halide, (2) an alkali metal hydroxide and/or an alkaline earth metal hydroxide and (3) calcium oxide and/or ettringite.

2. The deoxidizer of claim 1, wherein when said component (b) is component (1), said reduced iron powder is incorporated in said deoxidizer in an amount of 0.01 to 5 parts by weight per part by weight of said ferrous carbonate and the metal halide is incorporated in said deoxidizer in an amount of 0.0001 to 1 part by weight per part by weight of said reduced iron powder.

3. The deoxidizer of claim 1, wherein the metal halide is sodium chloride.

4. The deoxidizer of claim 1, wherein when said component (b) is said component (2), the amount of hydroxide incorporated in said deoxidizer ranges from 0.05 to 2 parts by weight per part by weight of ferrous carbonate.

5. The deoxidizer of claim 4, wherein the hydroxide is calcium hydroxide.

6. The deoxidizer of claim 1, wherein said component (b) is component (3), said calcium oxide is incorporated in said deoxidizer in an amount of 6 to 25 parts by weight per 100 parts by weight of said ferrous carbonate.

7. The deoxidizer of claim 1, wherein when said component (b) is component (3) said ettringite is incorporated in said deoxidizer in an amount of 12 to 50 parts by weight per 100 parts by weight of said ferrous carbonate.

8. The deoxidizer of claim 1, wherein when said component (b) is component (3), 4 to 20 parts by weight of calcium oxide and 10 to 40 parts by weight of ettringite are combined with 100 parts by weight of said ferrous carbonate.

9. The deoxidizer of claim 1, wherein when said component (b) is component (3), 3 to 18 parts by weight of calcium oxide, 8 to 35 parts by weight of ettringite and 4 to 16 parts by weight of an alkali metal hydroxide are combined with 100 parts by weight of said ferrous carbonate.

10. The deoxidizer according to claim 1, wherein when said component (b) is component (3), 3 to 18 parts by weight of calcium oxide, 8 to 35 parts by weight of ettringite and 4 to 16 parts by weight of an alkaline earth metal hydroxide are combined with 100 parts by weight of said ferrous carbonate.

* * * * *

UNITED STATES PATENT AND TRADEMARK OFFICE
CERTIFICATE OF CORRECTION

PATENT NO. : 4,299,719
DATED : Nov. 10, 1981
INVENTOR(S) : Motohisa Aoki, et. al.

It is certified that error appears in the above—identified patent and that said Letters Patent is hereby corrected as shown below:

On the title page, Priority Data should read:

[30]---Foreign Application Priority Data

Oct. 23, 1978 [JP] Japan..................53-130245

May 11, 1979 [JP] Japan..................54-57864

May 11, 1979 [JP] Japan..................54-57865

Jul. 6, 1979 [JP] Japan..................54-85541 --.

Signed and Sealed this

Sixteenth Day of February 1982

[SEAL]

Attest:

GERALD J. MOSSINGHOFF

*Attesting Officer*     *Commissioner of Patents and Trademarks*